United States Patent [19]

Spatafora et al.

[11] Patent Number: 5,746,872
[45] Date of Patent: May 5, 1998

[54] METHOD AND UNIT FOR END SEALING ELONGATED WRAPPINGS

[75] Inventors: Mario Spatafora, Bologna; Andrea Berti, Castel San Pietro Terme, both of Italy

[73] Assignee: Azionaria Costruzioni Macchine Automatiche ACMA, SpA, Bologna, Italy

[21] Appl. No.: 631,250

[22] Filed: Apr. 12, 1996

[30] Foreign Application Priority Data

Apr. 13, 1995 [IT] Italy .................... B095A0161

[51] Int. Cl.⁶ .................... B32B 31/00
[52] U.S. Cl. .................... 156/274.2; 156/380.2; 156/556; 156/567
[58] Field of Search .................... 156/272.2, 380.2, 156/274.2, 567, 566, 556, 308.4; 219/604, 633; 53/176, 216, 234, 380

[56] References Cited

U.S. PATENT DOCUMENTS

| | | | |
|---|---|---|---|
| 2,184,280 | 12/1939 | Clark | 156/272.4 X |
| 2,568,794 | 9/1951 | Dieter | 219/604 |
| 3,462,336 | 8/1969 | Leatherman | 156/272.4 |
| 3,864,186 | 2/1975 | Balla | 219/604 X |
| 3,923,585 | 12/1975 | Vouillemin | |
| 4,152,566 | 5/1979 | Magerle | 219/633 X |
| 4,248,653 | 2/1981 | Gerber | 156/272.4 |
| 4,704,509 | 11/1987 | Hilmersson | 156/274.2 X |
| 4,829,752 | 5/1989 | Focke et al. | |
| 4,995,223 | 2/1991 | Spatafora | |
| 5,031,380 | 7/1991 | Ueda | 156/272.4 |

FOREIGN PATENT DOCUMENTS

| | | |
|---|---|---|
| 0265660 | 5/1988 | European Pat. Off. |
| 2176558 | 11/1973 | France . |
| 2229156 | 9/1990 | United Kingdom . |

Primary Examiner—Jeff H. Aftergut
Attorney, Agent, or Firm—Christensen O'Connor Johnson & Kindness PLLC

[57] ABSTRACT

Elongated wrappings made of sheet material comprising a first metal component and a second heat-sealable component are end sealed by successively feeding the wrappings, by means of a conveyor, in a first given direction and along a given path through a sealing station; varying the traveling speed of the wrappings in relation to the conveyor at the sealing station; and induction heating, for a given length of time during a relative pause, the first component at the ends of each wrapping, to melt the second component.

13 Claims, 3 Drawing Sheets

METHOD AND UNIT FOR END SEALING ELONGATED WRAPPINGS

BACKGROUND OF THE INVENTION

The present invention relates to a method of end sealing elongated wrappings.

More specifically, the present invention relates to a straightforward, effective method of end sealing elongated wrappings fed by a conveyor along a given path and made of sheet material comprising a metal component and a heat-sealable component.

The present invention is particularly suitable for use in the food industry, for end sealing elongated, not necessarily cylindrical, wrappings or so-called "sticks" on wrapping machines, to which the following description refers purely by way of example.

SUMMARY OF THE INVENTION

According to the present invention, there is provided a method of end sealing elongated wrappings made of sheet material comprising a first metal component and a second heat-sealable component; the method comprising the step of successively feeding the wrappings, by means of a conveyor, in a first given direction and along a given path extending through an end sealing station; characterized in that it comprises the further steps of varying the traveling speed of the wrappings in relation to the conveyor at the sealing station; and heating at least one end of the wrapping for a given length of time, to melt said second component at said end and seal the end itself.

According to a preferred embodiment of the above method, said first component is heated by magnetic induction.

Preferably, said first component is heated by magnetic induction by means of an induction sealing head movable to and from said path in a second direction substantially crosswise to said first direction.

More specifically, in the above method, the first component comprises a first layer of metal material, and the second component comprises a second layer of heat-sealable material.

According to one embodiment of the above method, the wrappings are fed along said path by a drum conveyor rotating at substantially constant speed about its axis, and presenting oscillating grips, each of which feeds a respective wrapping crosswise to the longitudinal axis of the wrapping; said variation in the speed of the wrappings in relation to the conveyor being achieved by so oscillating the respective grips that, at the sealing station, the wrappings travel along a trajectory extending in a third direction substantially radial in relation to the conveyor.

In the above embodiment of the method, said first layer is heated by means of an induction sealing head, which is oscillated in two substantially perpendicular directions to move it, parallel to the longitudinal axis of the wrapping, to and from the respective said end of each said wrapping, as well as along said trajectory.

The present invention also relates to a unit for end sealing elongated wrappings.

According to the present invention, there is provided a unit for end sealing elongated wrappings made of sheet material comprising a first metal component and a second heat-sealable component; the unit comprising a conveyor for successively feeding the wrappings in a first given direction and along a given path; and an end sealing station located along said path; characterized in that it also comprises speed varying means connecting each said wrapping to the conveyor, and for varying the traveling speed of the wrappings in relation to the conveyor at the sealing station; and heating means located at the sealing station and cooperating with the wrapping to heat said first component at at least one end of the wrapping for a given length of time at the sealing station, and so melt said second component at said end to seal the end itself.

According to a preferred embodiment of the above unit, said heating means are magnetic induction heating means.

Said heating means preferably comprise an induction sealing head, and first actuating means for moving the head to and from said path in a second direction substantially crosswise to said first direction.

According to one embodiment of the above unit, said conveyor is a drum conveyor rotating at substantially constant speed about its axis; said speed varying means comprising, for each said wrapping, an oscillating grip for feeding a respective wrapping crosswise to the longitudinal axis of the wrapping, and second actuating means interposed between the drum conveyor and said grip, and for so oscillating the grip that, in use and at the sealing station, the respective wrapping travels along a trajectory extending in a third direction substantially radial in relation to the drum conveyor.

The unit according to the above embodiment comprises an induction sealing head mounted so as to oscillate in relation to the drum conveyor about two axes, a first of which is crosswise and a second parallel to the axis of the drum conveyor; first actuating means being provided to move said head, parallel to the longitudinal axis of the wrapping, about said first axis and to and from the respective said end of each said wrapping; and third actuating means being provided to move said head about said second axis and along said trajectory.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
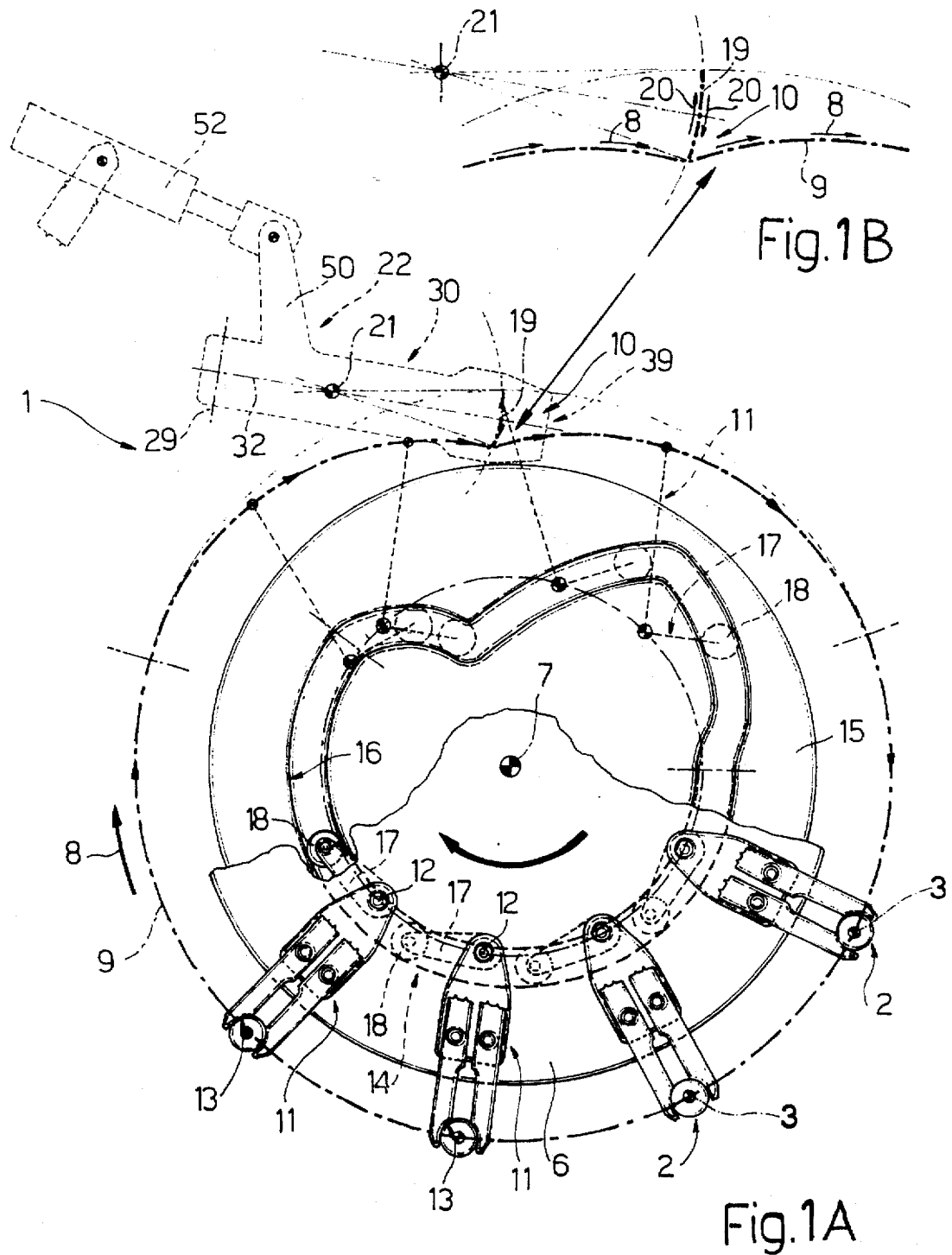
FIG. 1 shows a schematic side view, with parts removed for clarity, of a preferred embodiment of the sealing unit according to the present invention.

Number 1 in the accompanying drawings indicates a unit for end sealing normally, but not necessarily, cylindrical elongated wrappings 2 presenting a longitudinal axis 3, and made of sheet material comprising a metal layer 4, preferably of foil, and a cover layer 5 of heat-sealable material, preferably lacquer.

Unit 1 comprises a conveyor drum 6 rotating at substantially constant angular speed about its axis 7 to successively feed wrappings 2 in a given direction 8 and along an annular path 9 extending through a sealing station 10 where wrappings 2 are end sealed.

As shown clearly in FIG. 1, drum 6 comprises a number of grips 11 connected to it in rotary manner by respective pins 12 parallel to, and equally spaced along a circumference coaxial with, axis 7. At its free end opposite that connected to respective pin 12, each grip 11 defines a seat 13 for receiving a respective wrapping 2 with its axis 3 parallel to axis 7; and each grip 11 forms part of a speed varying device 14 comprising a fixed cam 15 with an annular face groove 16 extending about axis 7. For each grip 11, device 14 also comprises a lateral lever 17 integral with grip 11 and fitted on its free end, a given distance from respective pin 12, with a tappet roller 18 rotating, in relation to respective lever 17, about its axis parallel to axis 7, and engaged in rolling manner inside groove 16.

As shown in FIG. 1, to maintain grips 11 in a substantially radial position in relation to drum 6, groove 16 is substantially circular, except for a portion in the region of station 10 where groove 16 is so shaped as to first rotate each grip 11 about pin 12 in the same direction as drum 6 about axis 7, and then rapidly rotate each grip 11 in the opposite direction to drum 6, so as to cause, for a given length of time at station 10, a pause in the movement of seat 13 in direction 8. Since pin 12 of each grip 11 continues to rotate continuously about axis 7 even during the pause of respective seat 13, this, during the pause, acts as a link which travels back and forth along a trajectory 19 extending outwards from path 9 in a direction 20 substantially perpendicular to direction 8 at station 10. In practice, trajectory 19 extends along an arc, the axis 21 of which is parallel to axis 7 and located outside the circle defined by path 9.

Figure 3:
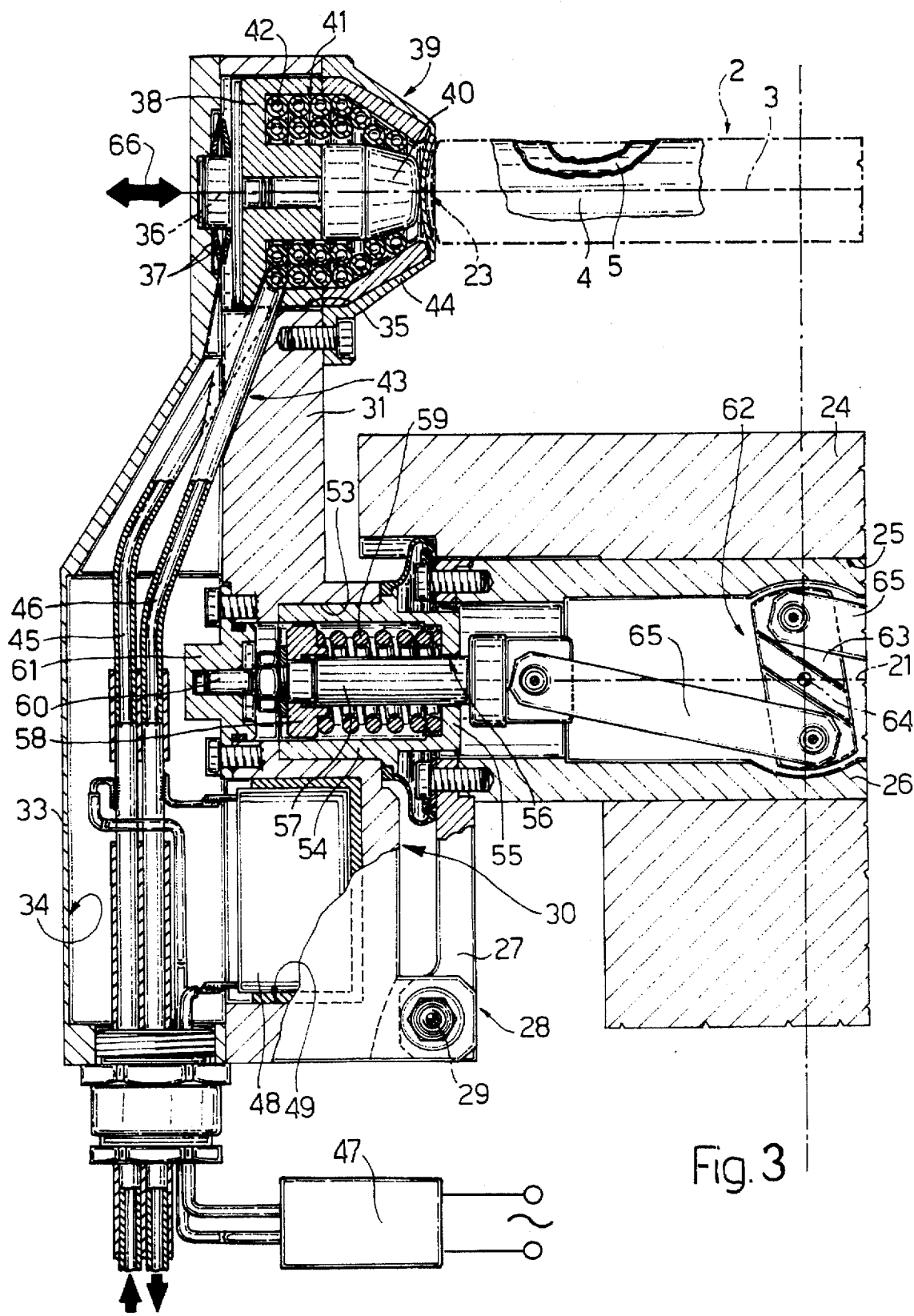
FIG. 3 shows a section along line III—III in FIG. 2.

At station 10, drum 6 cooperates with an end sealing device 22 which, as shown in FIG. 3, cooperates with opposite ends 23 (only one shown) of wrapping 2 to end seal the wrapping.

Device 22 comprises a fixed support 24 located outwards of the outer periphery of drum 6, and presenting a cylindrical through hole 25 coaxial with axis 21 and engaged in rotary manner by a through sleeve 26. Each end of sleeve 26 projects from hole 25, and is fitted with a radial appendix 27, the free end of which is fitted with a respective movable sealing element 30 (only one shown) by means of a hinge 28 presenting an axis 29 crosswise to axis 21.

As sealing elements 30 are specularly identical, are located on either side of, and move simultaneously and in the same manner in relation to, drum 6, only one element 30 will be described. In this connection, it should be pointed out that certain wrappings 2 present only one end 23 for sealing, in which case, device 22 comprises only one movable sealing element 30.

Element 30 comprises an arm 31 connected at one end to appendix 27 by hinge 28, extending along an axis 32 perpendicular to axis 21 and crosswise to axis 29, and facing the relative end of sleeve 26. On the side opposite that facing sleeve 26, arm 31 is fitted with a casing 33 with which it defines a chamber 34 extending along axis 32.

At the opposite end to that connected to appendix 27, arm 31 presents a through hole 35 with an axis 36 perpendicular to axis 32, and which receives in axially-sliding manner, in opposition to a Belleville washer 37 cooperating with casing 33, a cylindrical block 38 forming the base of an induction sealing head 39 located at station 10. Head 39 comprises a ferrite core 40 coaxial with axis 36; a winding 41 wound about core 40 and in turn comprising a copper tube 42 defining the end portion of a cooling fluid, e.g. air, circuit 43 for maintaining head 39 within a given temperature; and a cap 44, preferably made of synthetic material, and for preventing direct contact between core 40 and wrappings 2.

Tube 42 comprises an input portion 45 and an output portion 46, both extending along chamber 34 and connected to opposite poles of a mains-connected control unit 47, the first directly, and the second via at least a condenser 48 housed inside a chamber 49 formed in the thickness of arm 31 and communicating with chamber 34.

Figure 2:
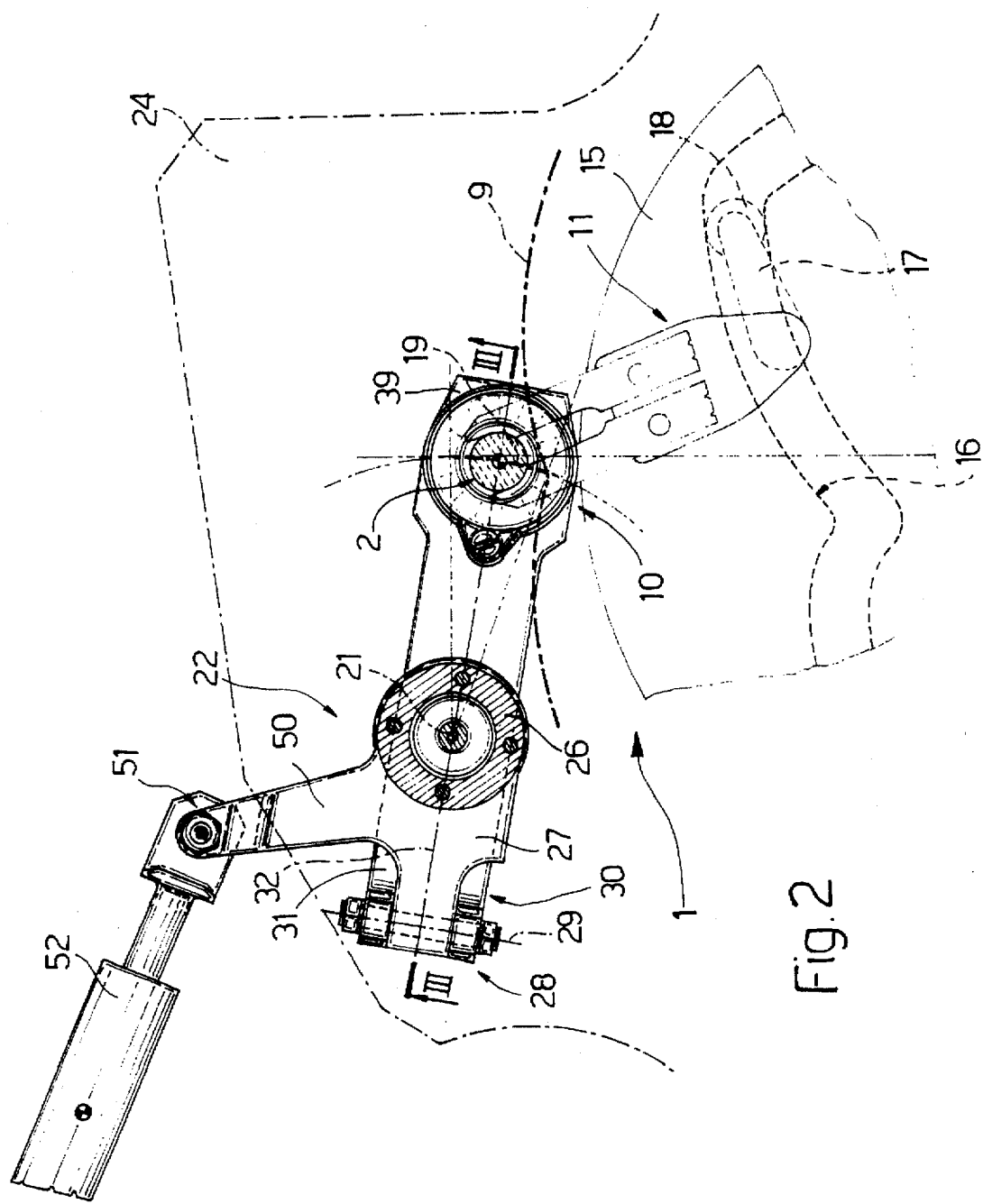
FIG. 2 shows a larger-scale detail of FIG. 1.

As shown, particularly in FIG. 2, appendix 27 presents a lateral arm 50, the free end of which is possibly integral with the corresponding arm 50 (not shown) of the other element 30 (if provided), and is connected, by a hinge 51 with an axis parallel to axis 21, to the free end of the output rod of an axial actuator 52 for rotating sleeve 26 and arm 31 about axis 21 by such a given maximum angle as to enable head 39 to travel both ways along trajectory 19 at station 10.

An intermediate portion of arm 31 presents a further through hole 53 coaxial with axis 21 and housing in a fixed position a cup-shaped body 54; one end of body 54, partly engaged inside sleeve 26, is closed by an end wall 55 presenting a hole 56 coaxial with axis 21 and engaged in axially-sliding manner by a rod 57; and an intermediate portion of rod 57 is fitted with a plate 58 sliding inside body 54 in opposition to a damping spring 59 interposed between plate 58 and end wall 55. At the end facing arm 31, rod 57 presents a tip 60 cooperating frontally with a cover 61 fitted to arm 31 to close the end of hole 53 facing casing 33. Rod 57 forms a link of a double-link actuating crank mechanism 62 comprising a double crank 63 housed inside sleeve 26 and oscillated by a drive shaft (not shown) about an intermediate axis 64 perpendicular to axis 21; and two connecting rods 65 hinged to opposite ends of double crank 63 and respectively connected to the end of rod 57 opposite that presenting tip 60, and to the other rod 57 (not shown) of the other element 30 (not shown) if provided.

In actual use, as each wrapping 2 arrives at station 10, control unit 47 activates head 39 to supply a given current through winding 41 and generate, at station 10, a variable magnetic field capable of inducing, in layer 4 of wrapping 2 at station 10, sufficient current to heat layer 4 and melt the heat-seal material of layer 5 to end seal wrapping 2.

To ensure perfect sealing, as each wrapping 2 enters station 10, element 30 is oscillated by actuator 52 in direction 20 and about axis 21 to enable sealing head 39 to accompany wrapping 2 as it travels along trajectory 19. At the same time, element 30 is also oscillated by crank mechanism 62 in a further direction 66, crosswise to direction 20, and to and from path 9, to enable head 39 to move parallel to axis 3 and to and from the respective end 23 of wrapping 2.

The above method and unit are equally applicable in the event wrapping 2, more generally speaking, presents at least one layer of material comprising a metal or conductive component and a heat-sealable component.

We claim:

1. A method of end sealing elongated wrappings made of sheet material comprising a first metal component and a second heat-sealable component; the method comprising:

successively feeding the wrappings, by means of a drum conveyor rotating at a substantially constant speed and presenting oscillating grips, each of which feeds a respective wrapping in a first given direction and along a given path extending through an end sealing station;

varying the traveling speed of the wrappings in relation to the conveyor at the sealing station by oscillating the respective grip of the sealing station so that wrappings at the sealing station travel along a trajectory extending in a third direction substantially perpendicular to the given path and substantially radial in relation to the drum conveyor; and heating at least one end of the wrapping for a given length of time, to melt said second component at said end and seal the end itself.

2. A method as claimed in claim 1, characterized in that said first component is heated by magnetic induction.

3. A method as claimed in claim 2, characterized in that said first component is heated by magnetic induction by means of an induction sealing head movable to and from said path in a second direction substantially crosswise to said first direction.

4. A method as claimed in claim 1, characterized in that said first component comprises a first layer of metal material, and said second component comprises a second layer of heat-sealable material.

5. A method as claimed in claim 4, characterized in that said first layer is heated by an induction sealing head, which is oscillated in two substantially perpendicular directions to move it, parallel to the longitudinal axis of the wrapping, to and from the respective said end of each said wrapping, as well as along said trajectory.

6. A method of end sealing elongated wrappings made of sheet material comprising a first metal component and a second heat-sealable component; the method comprising:

successively feeding the wrappings, by means of a drum conveyor rotating at a substantially constant speed and presenting oscillating grips, each of which feeds a respective wrapping in a first given direction and along a given path extending through an end sealing station;

varying the traveling speed of the wrappings in relation to the conveyor at the sealing station by oscillating the respective grip of the sealing station so that wrappings at the sealing station travel along a trajectory extending in a third direction substantially perpendicular to the given path and substantially radial in relation to the drum conveyor; and heating at least one end of the wrapping for a given length of time, to melt said second component at said end and seal the end itself, said heating by an induction sealing head which is oscillated in two substantially perpendicular directions to move it, parallel to the longitudinal axis of the wrapping, to and from the respective said end of each said wrapping, as well as along said trajectory.

7. A unit for end sealing elongated wrappings made of sheet material comprising a first metal component and a second heat-sealable component; the unit comprising:

a drum conveyor rotating at a substantially constant speed and presenting oscillating grips, each of which feeds a respective wrapping in a first given direction and along a given path;

an end sealing station located along said path;

speed varying means connecting each said wrapping to the conveyor, and for varying the traveling speed of the wrappings in relation to the conveyor at the sealing station;

actuating means interposed between the drum conveyor and said grip, and for so oscillating the grip so that a wrapping at the sealing station travels along a trajectory extending in a third direction substantially radial in relation to the drum conveyor; and heating means located at the sealing station and cooperating with the wrapping to heat said first component at at least one end of the wrapping for a given length of time at the sealing station, and so melt said second component at said end to seal the end itself.

8. A unit as claimed in claim 7, characterized in that said heating means are magnetic induction heating means.

9. A unit as claimed in claim 8, characterized in that said heating means comprise an induction sealing head, and first actuating means for moving the head to and from said path in a second direction substantially crosswise to said first direction.

10. A unit as claimed in claim 9, characterized in that said head comprises at least an electric winding defined by a coiled electrically conductive tube.

11. A unit as claimed in claim 10, characterized in that said tube forms part of a heat-exchange fluid circuit.

12. A unit as claimed in claim 7, characterized in that it comprises an induction sealing head mounted so as to oscillate in relation to the drum conveyor about two axes, a first of which is crosswise and a second parallel to the axis of the drum conveyor; first actuating means being provided to move said head, parallel to the longitudinal axis of the wrapping, about said first axis and to and from the respective said end of each said wrapping; and third actuating means being provided to move said head about said second axis and along said trajectory.

13. A unit for end sealing elongated wrappings made of sheet material comprising a first metal component and a second heat-sealable component; the unit comprising:

a drum conveyor rotating at a substantially constant speed and presenting oscillating grips, each of which feeds a respective wrapping in a first given direction and along a given path;

an end sealing station located along said path;

speed varying means connecting each said wrapping to the conveyor, and for varying the traveling speed of the wrappings in relation to the conveyor at the sealing station;

a first actuating means interposed between the drum conveyor and said grip, and for so oscillating the grip so that a wrapping at the sealing station travels along a trajectory extending in a third direction substantially radial in relation to the drum conveyor;

an induction sealing head located at the sealing station mounted so as to oscillate in relation to the drum conveyor about two axes, a first of which is crosswise and a second parallel to the axis of the drum conveyor, the induction sealing head configured to cooperate with the wrapping to heat said first component at at least one end of the wrapping for a given length of time at the sealing station, and so melt said second component at said end to seal the end itself;

a second actuating means to move said induction sealing head, parallel to the longitudinal axis of the wrapping, about said first axis and to and from the respective said end of each of said wrappings; and a third actuating means to move said head about said second axis and along said trajectory.

* * * * *